United States Patent [19]

Sakamoto et al.

[11] Patent Number: 4,901,427
[45] Date of Patent: Feb. 20, 1990

[54] PUNCH PRESS

[75] Inventors: Katsuyoshi Sakamoto; Takeshi Takahashi, both of Kanagawa, Japan

[73] Assignee: Amada Company, Limited, Japan

[21] Appl. No.: 11,867

[22] Filed: Feb. 6, 1987

[30] Foreign Application Priority Data

| Feb. 6, 1986 | [JP] | Japan | 61-15069 |
| Feb. 6, 1986 | [JP] | Japan | 61-15070 |
| Mar. 12, 1986 | [JP] | Japan | 61-34665 |
| Mar. 12, 1986 | [JP] | Japan | 61-34666 |

[51] Int. Cl.⁴ .................. B21D 37/14; B23Q 3/155
[52] U.S. Cl. ........................ 29/568; 72/446; 83/563
[58] Field of Search ............... 29/568; 72/446; 83/563

[56] References Cited

U.S. PATENT DOCUMENTS

| 3,765,291 | 10/1973 | Stenfeld | 29/568 X |
| 3,816,904 | 6/1974 | Herb | 29/568 |
| 4,205,427 | 6/1980 | Koch et al. | 29/568 |
| 4,423,546 | 1/1984 | Scott et al. | 29/568 |
| 4,587,716 | 5/1986 | Bytow | 29/568 |

FOREIGN PATENT DOCUMENTS

0106630 6/1985 Japan ...................... 72/446

Primary Examiner—Z. R. Bilinsky
Attorney, Agent, or Firm—Wigman & Cohen

[57] ABSTRACT

To easily mount the ram drive unit on the upper frame of a punch press without being subjected to the influence of heat generated from the ram drive unit, the ram drive unit (23) is mounted on the upper frame symmetrical right and left when seen from the front. To accurately determine the angular position of a tool set, the punch holder (95) is fitted to the cylindrical pivotal member (113) with a positive fit tolerance to eliminate a or slip along the circumferential direction thereof. Further, the punch press is provided with a die holder (17) including a die fixing device (133) composed of a die push member (169), a hydraulic cylinder (165) and a piston rod (167) and further with an automatic tool exchange device (29) located equidistantly away from the process position and the tool exchange position.

8 Claims, 8 Drawing Sheets

PUNCH PRESS

BACKGROUND OF THE INVENTION

1. Field of the Invention

The present invention relates to a punch press for punching a plate workpiece, and more specifically to a punch press provided with an automatic tool exchange device for exchanging the tool set of a punch and die arranged at the process position with another tool set.

2. Description of the Prior Art

In general, a punch press is constructed having a C-shpaed frame structure such that an upper frame is supported by a column standing on one side of a base in cantilever fashion. A die is fitted to a die holder disposed on the base, and a punch is attached to the lower part of a ram or a punch holder supported by the upper frame so as to the movable up and down in order to punch a plate workpiece in cooperation with the die.

In the conventional punch press, usually a ram drive unit for driving the ram (which moves the punch holder up and down) is mounted on one end of the upper frame. In this case, a clutch-brake unit is mounted at one end of the upper frame or a clutch unit and a brake unit are mounted separately on both the right and left sides of the upper frame when seen from the front of the press. Therefore, there exist problems such that the influence of heat generated from the ram drive unit is different between the right and left sides of the upper frame so that the upper frame is subjected to deformation. In addition, it has been difficult to mount the drive unit on the upper frame located at a high position.

Further, in the conventional punch press, when various punching processings are effected with a single tool set by pivoting the punch and die together in various directions, since the punch holder is moved up and down and further pivoted, when the press is operated for many hours, there exists a problem in that a clearance increases between the punch holder and the pivotal member and therefore the punch holder section tends to slip in the circumferential direction thereof, thus deteriorating the processing precision.

Further, the conventional punch press is provided with an automatic tool exchange device for automatically exchanging a tool set of punch and die fitted to the punch holder and the die holder at the process position with another tool set, so that various punching processings of different shapes can be made for the same workpiece.

In the punch press provided with the automatic tool exchange device, a die fixing device for automatically fixing a die to the die holder is provided. This die fixing device includes a die push member for urging and fixing the die to the die holder. A known die fixing device is such that a die is urged toward the die holder by shifting a pivotal die push member from a horizontal position to a vertical position. In the prior-art die fixing device as described above, however, since the stroke of the die push member is long, there exists a problem in that a device for operating the die push member is bulky and therefore the whole punch press inevitably increases in dimensions.

Furthermore, in the prior-art punch press provided with the automatic tool exchange device, a stopper is provided to determine stop positions of the arms of the tool exchange device. However, in the case where the arms are located at three different angular positions, there exists a problem such that the intermediate stop position is offset by a distance corresponding to the stopper thickness when the arm is brought into contact with the stopper.

SUMMARY OF THE INVENTION

With these problems in mind, therefore, it is a first object of the present invention to provide a punch press in which a ram drive unit for moving a ram up and down is readily assembled on the upper frame and the upper frame is not subjected to deformation due to heat generated from the ram drive unit.

To achieve the above-mentioned object, in the punch press according to the present invention, the ram drive unit is formed in a single body symmetrical right and left (when seen from front) with respect to a central longitudinal vertical surface of the punch press and mounted at the center of the upper frame of the punch press.

A second object of the present invention is to provide a punch press in which no clearance or slip is produced in the circumferential direction of the punch holder even when the punch holder and the die holder are pivoted together to effect different punching processings with a single tool set.

To achieve the above-mentioned object, in the punch press according to the present invention, the punch holder is fitted to a cylindrical pivotal so as to the movable up and down with a positive fit tolerance.

A third object of the present invention is to provide a punch press provided with a die fixing device for fixing an exchangeable die to a die holder, which is small in size and simple in construction.

To achieve the above-mentioned object, in the punch press according to the present invention, there is provided a die push member projectable and retractable from a die receive portion formed on the upper surface of the die holder and further pivotal in a direction that the die is urged toward the die locating member, in such a way that the die push member is first moved upward and then pivoted with a time delay to fix the die to the die holder.

A fourth object of the present invention is to provide a punch press provided with an automatic tool exchange device, by which a tool set can be exchanged efficiently and accurately at the process position of the punch press.

To achieve the above-mentioned object, in the punch press according to the present invention, the automatic tool exchange device having a first arm for removing a tool set from the tool holder plate for holding a number of tool sets and fitting the removed tool set at the process position and a second arm for removing a tool set from the process position and accommodating the removed tool set to the tool holder plate is arranged at an equidistance position from the tool exchange position and the process position.

A drive system of the tool exchange device comprises a first hydraulic cylinder fixed to the frame of the punch press and a second hydraulic cylinder movable in a straight line relative to the punch press. The first and second hydraulic cylinders are arranged in parallel to each other; two piston rods are connected to each other; and drive means (rack) is provided for the second hydraulic cylinder so as to engage with a pinion of a drive shaft supported by the frame to pivot the tool.

DESCRIPTION OF THE PREFERRED EMBODIMENTS

Figure 1:
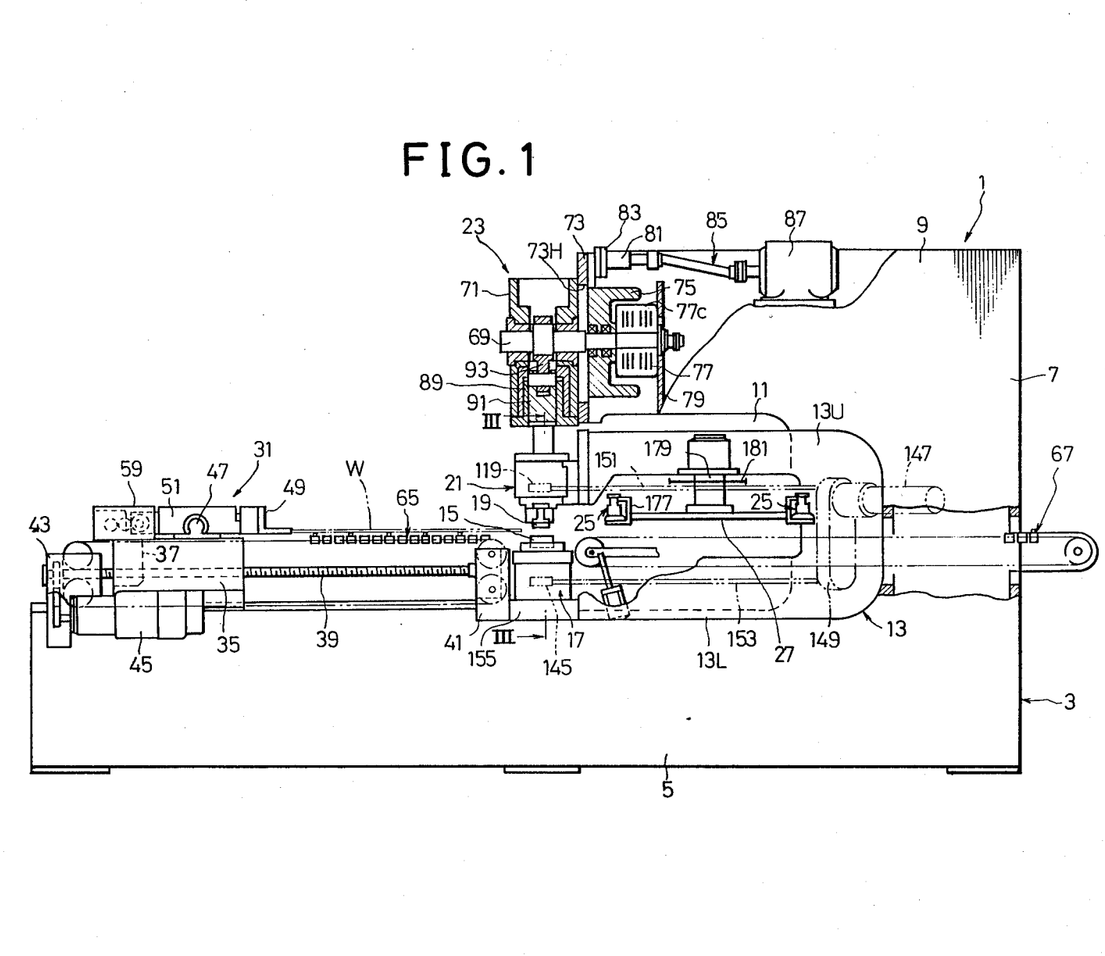
FIG. 1 is a side view, partially in cross section, of a punch press to which the present invention is applied.

With reference to FIG. 1, a punch press related to an embodiment of the present invention will be described. The punch press 1 is of a C-shaped frame type. A frame 3 is composed of a base 5, a column 7 and an upper frame 9.

To hold a tool for processing a plate workpiece at a process position, a tool holder 13 of C-shaped frame structure made up of an upper arm 13U and a lower arm 13L is arranged within a C-shaped throat portion 11 enclosed by the base 5, the column 7 and the upper frame 9. The lower arm 13L of the tool holder 13 is fixed to the upper surface of the base 5 with bolts. A die holder 17 for removably supporting a die 15 as described later is disposed at the end of the lower arm 13L.

A punch holder 21 for removably supporting a punch 19 for punching a workpiece W in cooperation with the die 15 is disposed at the end of the upper arm 13U of the tool holder 13.

A ram drive unit 23 for moving the punch 19 up and down is arranged over the punch holder 21 to punch a workpiece W. This ram drive unit 23 is mounted at the end of the upper frame 9 so as not to be subjected to the influence of heat generated from the ram drive unit 23 as described later.

Figure 2:
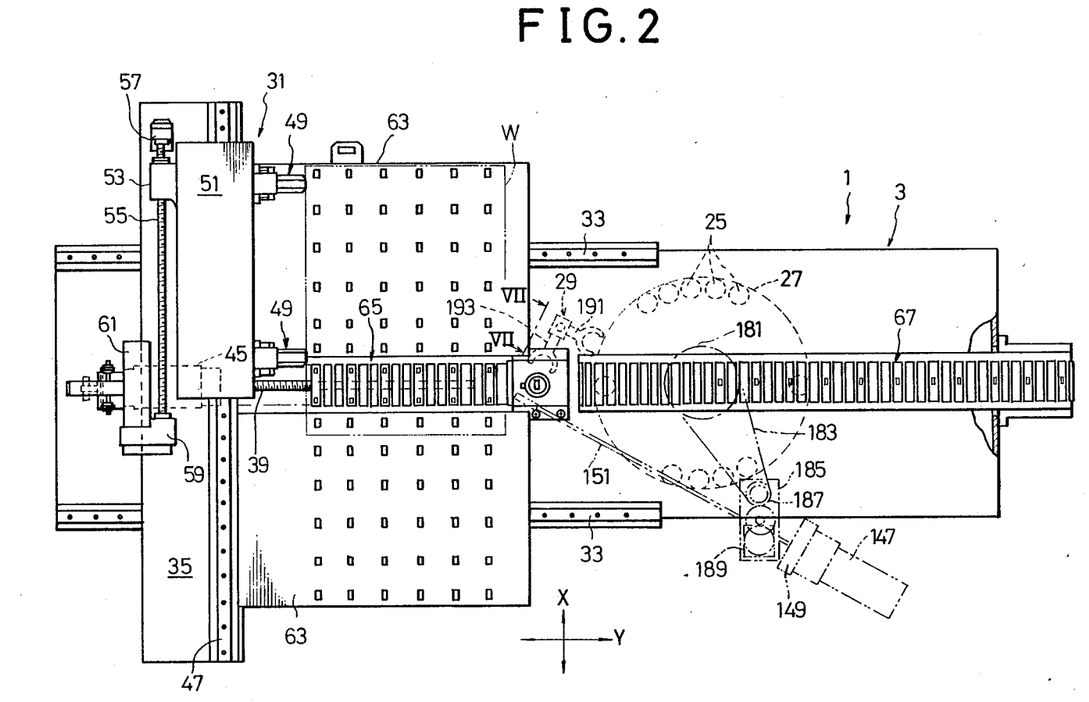
FIG. 2 is a partial plan view of FIG. 1.

Further, as shown in FIGS. 1 and 2, the punch press 1 is provided with a disc-shaped tool holder plate 27 for removably supporting a plurality of various tool sets 25 (punch and die) for replacement, and an automatic tool exchange device 29 (FIG. 2) for automatically setting a tool set 25 removed from the tool holder plate 27 to the punch holder 21 and the die holder 17 and automatically return a tool set 25 removed from the punch holder 21 and the die holder 17 to the tool holder plate 27.

Further, a workpiece moving and positioning device 31 for moving a workpiece W in the X- and Y-axis directions at the process position is disposed on the base 5.

In more detail, as shown in FIG. 2, two guide members 33 are disposed in parallel to each other extending in the Y-axis direction (the longitudinal direction of the machine) on both the sides of the base 5 of the X-axis direction (the lateral direction of the machine). A carriage base 35 extending in the X-axis direction is movably supported by the two guide members 33 on the sides of the carriage base 35. This carriage base 35 is formed substantially symmetrical with respect to a central longitudinal line (Y-axis) of the machine. Two sliders (not shown) are attached to the under surface of the carriage base 35 on both the end of the carriage base 35 so as to slidably support the carriage base on and along the two guide members 33. That is, the carriage base 35 is movably supported by two guide members 33 via base sliders, so as to reciprocably move toward or away from the process position along the guide members 33.

To drive the carriage base 35 along the guide members 33, a nut member 37 (see FIG. 1) is disposed under the middle of the carriage base 35 in the X-axis direction. This nut member 37 is engaged with a ball screw 39 extending in the Y-axis direction. One end of the ball screw 39 is rotatably supported by a first U-shaped bearing block 41 mounted on the base 5 in the vicinity of the die holder 17; while the other end thereof is rotatably supported by a second prism-shaped bearing block 43 mounted on the other end of the base 5. To drive the ball screw 39, a Y-axis servomotor 45 is mounted on the other end of the base 5. A drive shaft of this Y-axis servomotor 45 and the ball screw 39 are linked with each other by an appropriate transmission mechanism such a timing belt, gear mechanism, etc.

Therefore, when the Y-axis servomotor 45 is controllably driven to rotate the ball screw 39, the carriage base 35 is moved and positioned along the Y-axis direction via the nut member 37 engaged with the ball screw 39.

In order to move and position a workpiece W in the X-axis direction, an X-axis guide member 47, extending in the X-axis direction perpendicular to the direction that the carriage base 35 is moved, is mounted on the carriage base 35. On this X-axis guide member 47, a carriage 51 having two work clamping devices 49 is movably supported. The above work clamping device 49 is conventional in structure, so that the description thereof is omitted herein.

A nut member 53 is attached on one end of the carriage 51, and a ball screw 55 extending in the x-axis direction is engaged with this nut member 53. One end of the ball screw 55 is rotatably supported by a bearing block 57 mounted on one end of the carriage base 35, while the other end of the ball screw 55 is rotatably supported by a reduction unit 59 mounted near the middle of the carriage base 35. To this reduction unit 59, an X-axis servomotor 61 extending toward the middle of the carriage base 35, is connected. The reduction unit 59 is of conventional type, so that the description thereof is omitted herein.

To support a workpiece W clamped by the two work clamp devices 49 of the carriage 51, two movable tables 63 are separately attached to the carriage base 35 on both the ends thereof. Further, a caterpillar table 65 is disposed between these two movable tables 63.

A carry conveyer 67 is provided to carry out products or scraps away from the process position when relatively large-sized products or scraps are separated from a plate workpiece W during punching operations with the punch 19 and the die 5.

Owing to the construction as described above, a tool set supported by the punch holder 21 and the die holder 17 at the process position can be replaced with one of various tool sets by the automatic tool exchange device 29, and a workpiece W can be appropriately punched by the punch 19 fitted to the punch holder 21 and the die 15 fitted to the die holder 17 when the ram drive unit 23 is operated.

Further, a workpiece W can be moved in the X- and Y-axis direction and positioned to the process position by the workpiece moving and positioning device 31 before punching operation.

With reference to FIG. 1 again, the ram drive unit 23 for moving the punch 19 up and down is mounted on the end of the upper frame 9 as already explained.

In more detail, the ram drive unit 23 is provided with a box-shaped ram guide casing 71 in which a realtively short eccentric shaft 69 extending in the Y-axis direction is rotatably supported. This ram guide casing 71 is removably mounted on the middle of a front panel 73 vertically fixed to the front end of the upper frame 9 with bolts. A flywheel 75 passing through a through-hole 73H formed in the front panel 73 is rotatably supported by the eccentric shaft 69 projecting from the casing 71 in the rearward direction. Further, a clutch-brake unit 77 for transmitting or not transmitting the rotation of the flywheel 75 to the eccentric shaft 69 is supported by the eccentric shaft 69. A casing 77C for this clutch-brake unit 77 is fixed with bolts to a subplate 79 on the upper frame 9 at a position remote from the front panel 73.

As understood, the ram drive unit 23 is an assembly of the ram guide casing 71, the flywheel 75, and the clutch-brake unit 77. Therefore, the ram drive unit 23 can easily be mounted on or removed from the upper frame 9, thus facilitating maintenance or repair work.

In the above ram drive unit 23, the ram guide casing 71, the flywheel 75 and the clutch-brake unit 77 are arranged along the eccentric shaft 69 toward the Y-axis direction in symmetry with respect to the longitudinal axis of the eccentric shaft 69 when seen from the front of the press. Further, the above ram drive unit 23 is mounted at the middle of the upper frame 9 in the X-axis direction in symmetry with respect to a central longitudinal vertical surface of the punch press. Therefore, heat generated from the clutch-brake unit 77 is uniformly transmitted to the upper frame 9, so that is is possible to prevent the upper frame 9 from being deformed in an unbalanced manner, and thus it is possible to maintain the alignment of the die 15 and the punch 19 at all times.

To rotate the flywheel 75, a drive pulley 83 is rotatably supported by a bearing block 81 near the end of the upper frame 9. An endless belt is trained around the drive pulley 83 and the flywheel 75. The drive pulley 83 is linked with a drive motor 87 installed on the upper frame 9 via an appropriate transmission mechanism 85 such as universal joint.

By this construction, when the flywheel 75 is rotated by the drive motor 87 and the clutch-brake unit 77 is engaged, the rotation of the flywheel 75 is transmitted to the eccentric shaft 69. On the other hand, when the clutch-brake unit 77 is disengaged, the rotation of the flywheel 73 is stopped. The construction of the above clutch-brake unit 77 is well known, so that the description thereof is omitted herein.

As understood in FIG. 1, a ram guide 89 is provided within the ram guide casing 71. The ram 91 for moving the punch 19 up and down is supported by this ram guide 89 so as to be movable up and down. The upper portion of the ram 91 is linked with the eccentric shaft 69 via a connecting rod 93, so that the ram 91 is moved up and down when the eccentric shaft 69 rotates.

Figure 3:
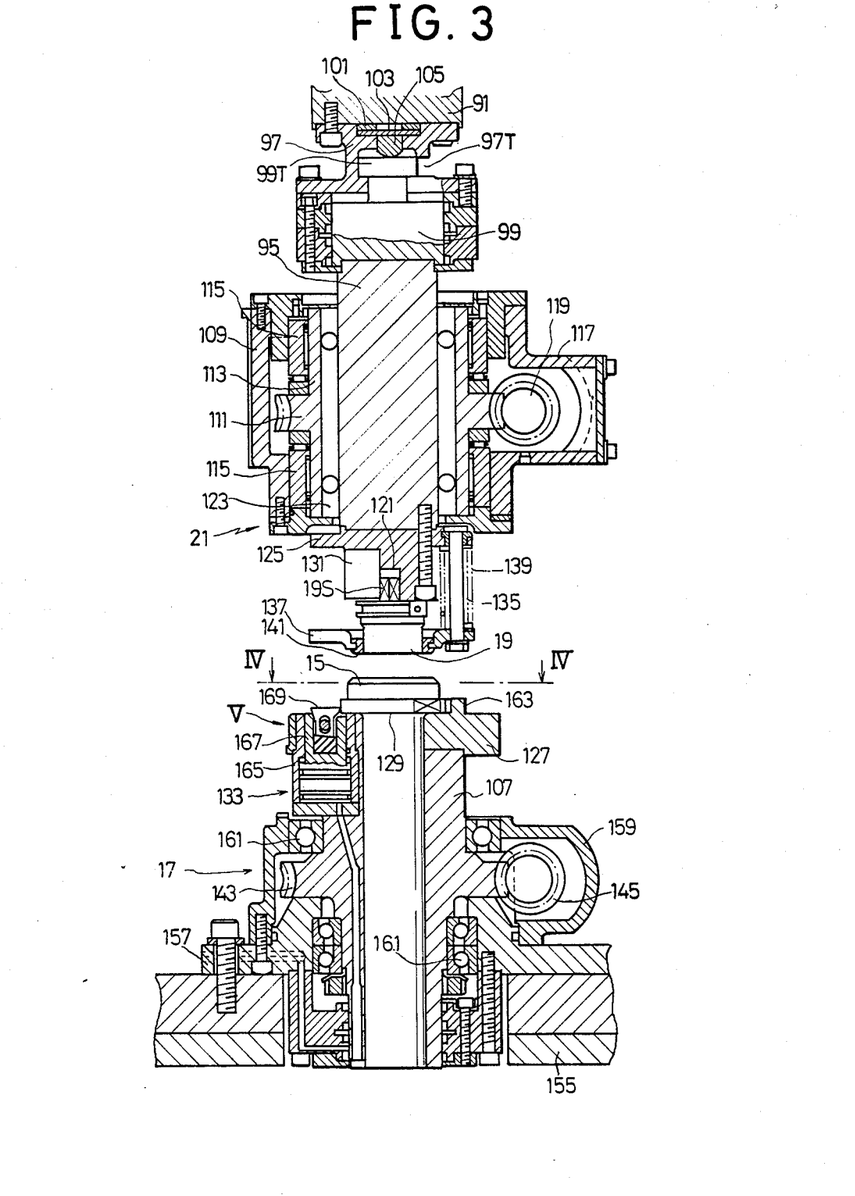
FIG. 3 is an enlarged cross-sectional view taken along the line III—III in FIG. 1.

With reference to FIG. 3, in order to vertically move the punch holder 95 for holding the punch 19 in the punch holder section 21, a connecting member 97 is disposed at the lower end of the ram 91, and a head member 99 connected to the connecting member 97 is disposed on the upper end of the punch holder 95.

In more detail, the connecting member 97 is formed with a T-shaped groove 97T to which a T-shaped connecting member 99T projectingly formed at the upper portion of the head member 99 is rotatably fitted. A backup ring 101 and a shear plate 103 are arranged between the connecting member 97 and the under surface of the ram 91, and a striker 105 intervenes between this shear plate 103 and the connecting member 99T. Therefore, the punch holder 95 can be moved up and down together with the ram 91. Further, in case an excessive load is applied to the punch 19 and the die 15 during punching operation, the shear plate 101 is punched off by the striker 105 for safety to prevent the tool and the press from being damaged.

In FIG. 3, in the punch holder section 21 for supporting the punch 19, the punch holder 95 for removably supporting the punch 19 is provided. This punch holder 95 supports the punch 19 so that the punch 19 is rotatable and movable up and down under the condition that the punch holder 95 and a die holder 107 (described later) are aligned in the vertical direction.

In more detail, within a bearing casing 109 attached to the end of the upper arm 13U (not shown in FIG. 3) of the tool holder 13 (see FIG. 1), a cylindrical pivotal member 113 with a worm gear 111 at the outer periphery thereof is supported by a plurality of bearings 115 such as needle bearings so as to be pivotably movable up and down. The worm gear 111 is in mesh with a worm 119 rotatably supported within a worm casing 117 mounted on a bearing casing 109.

Within the pivotal member 113, the punch holder 95 formed with a punch setting portion 121 at the lower end thereof is fitted so as to be movable only up and down. That is, the punch holder 95 is fitted to the pivotal member 113 via a ball bush 123 so as to be movable up and down with a positive fit tolerance, so that no slip will be produced in the circumferential direction of the punch holder 95.

Therefore, even if the punch holder 95 is repeatedly moved up and down relative to the pivotable member 113 during punching operation, there exists no clearance between the pivotable member 113 and the punch holder 95 along the circumferential direction thereof, and therefore it is possible to accurately determine the angular position of the punch holder 95 integral with the pivotal member 113.

In FIG. 3, a punch support member 125 is fixed to the lower portion of the punch holder 95 with bolts, and the punch support member 125 is formed with the punch setting portion 121. Not shown in detail, the shape of the punch setting portion 121 is almost the same as that of a die receiving portion 129 formed in the die support member 127 (described later). That is, the punch setting portion 121 is formed with a V-shaped groove so as to receive a shank portion 19S of the punch 19. Further, punch fixing device 131 for fixing the punch 19 to the punch setting portion 121 is constructed in almost the same way as a die fixing device 133 (described later).

In FIG. 3, an appropriate number of support poles 135 are disposed so as to be vertically movable in the punch support member 125. A semicircular stripper holder 137 opening toward one direction is supported at the lower end of the support poles 135. A coil spring 139 is elastically disposed between the punch support member 125 and the stripper holder 137. An annular stripper plate 141 surrounding the punch 19 is supported by the stripper holder 137. The stripper plate 141 is removed simultaneously when the punch 19 is removed from the punch setting portion 121 through the opening of the stripper holder 137.

To move the punch holder 95 up and down, the upper end of the punch holder 95 is linked with the lower end of the ram 91 provided in the ram drive unit 23 so as to be movable up and down, as already explained.

To rotate the die holder 107 and the punch holder 95 in the same direction in synchronism with each other, the worm 119 in mesh with a worm gear 111 formed in the pivotal member 113 and a worm 145 in mesh with a worm gear 143 formed in the die holder 107 are both linked with an indexing servomotor 147, respectively. That is, as shown in FIGS. 1 and 2 by phantom lines, the servomotor 147 is mounted on a transmission device 149 installed on the side of the frame 3. An upper transmission shaft 151 is connected to the worm 119 and a lower transmission shaft 153 is connected to the worm 145. These two shafts 151, 153 are linked with this transmission device 149, respectively. This device 149 rotates both the shafts 151, 153 in the same direction via a gear mechanism or a timing belt in synchronism with each other.

When the servomotor 147 is controllably driven, the die holder 107 and the punch holder 95 are rotated together in the same direction, so that it is possible to locate a tool set of the die 15 and the punch 19 at any given angular positions for effecting various directional punching processings with a single tool set.

As shown in FIG. 1, the die holder 17 is supported by a holder base 155 fixed to the top end of the lower arm 13L of the tool holder 13. The die holder 107 (see FIG. 3) for removably supporting the die 15 is rotatably disposed in this die holder 17.

In more detail, as shown in FIG. 3, the die holder 107 is formed into a cylindrical body with the worm gear 143 on the outer peripheral surface thereof, and is rotatably supported vertically by a bearing block 157 fixed to the holder base 155 with bolts and a worm gear casing 159 via a plurality of bearings 161. The worm gear 143 is in mesh with a worm 145 rotatably supported by the worm casing 159. This worm 145 is rotated by the indexing servomotor 147 via the transmission shaft 153 (see FIGS. 1 and 2).

When the worm 145 is rotated, the die holder 107 is rotated, so that the die 15 supported by the die holder 107 is located at any given angular position.

Figure 4:
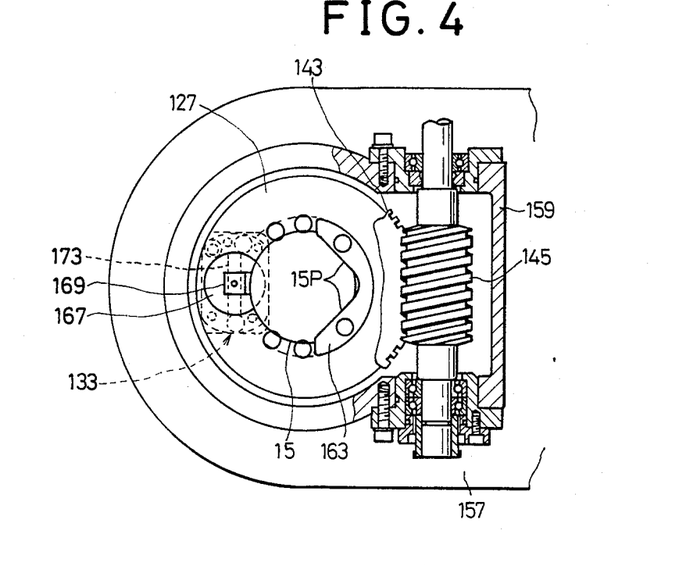
FIG. 4 is a side view, in partial cross-section, as seen from the line IV—IV in FIG. 3.

With reference to FIGS. 3 and 4, in order to support the die 15 removably or exchangeably, the disk-shaped die support member 127 is fixed to the upper portion of the die holder 107. The die receiving portion 129 is formed on the surface of this die support member 127. This die receiving portion 129 is formed with a vertical V-shaped die locating portion 163 fitted to a V-shaped locating surface 15P formed on the peripheral surface of the die 15. This die locating portion 163 can also be formed by arranging plural pins in V-shape, for instance, without being limited to the shown embodiment.

Therefore, the die 15 received by the die receiving portion 129 can be located when the die locating surface 15P is fitted to the die locating portion 163, so that the angular position of the die 15 and the die holder 107 can be secured. Therefore, when the die holder 107 is rotated, the die 15 and the punch 19 can be set to any given similar angular positions.

To fit the die locating surface 15P of the die 15 to the die locating portion 163 of the die receiving portion 129, the die fixing device 133 is disposed in the die holder 107. In more detail, as shown in FIG. 3, a hydraulic cylinder 165 serving as an operating device is disposed in the vicinity of the die receiving portion 129. A die push member 169 for urging the die 15 against the die locating portion 163 is disposed on the top end of a piston rod 167 movable up and down within the hydraulic cylinder 165. As described later, this die push member 169 projectable or retractable from the die receiving portion 129 urges the die 15.

Figure 5:
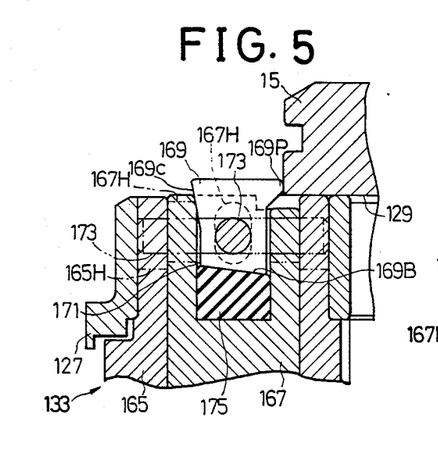
FIG. 5 is an enlarged cross-sectional view of the portion denoted by arrow V in FIG. 3, in which the part enclosed by dot-dot-dashed lines is shown by rotating the part by 90 degrees from that shown in FIG. 3.

As shown in more detail in FIG. 5, a recess 171 opening upward is formed on the upper end of the piston rod 167. The die push member 169 is fitted to this recess 171. In more detail, this die push member 169 is pivotably supported by a support pin 173 horizontally penetrating the die push member 169. This support pin 173 is passed through a vertical slot 167H formed in the piston rod 167, and both the ends of this pin 173 are located within vertical slots 165H formed at the upper portion of the hydraulic cylinder 165. This die push member 169 is formed with a die push portion 169P at the upper portion thereof, a cam surface 169C remote from the die push portion 169P, and a sloped bottom surface 169B with the die push portion 169P side down. An elastic member 175 fabricated from a material such as rubber urethane or other suitable elastic material is disposed between the bottom 169B of the die push member 169 and the bottom of the recess 171. Under the normal condition, the upper and lower surfaces of this elastic member 175 are parallel to each other. In FIG. 5, however, the elastic member 175 is shown in compressed state.

Figure 6:
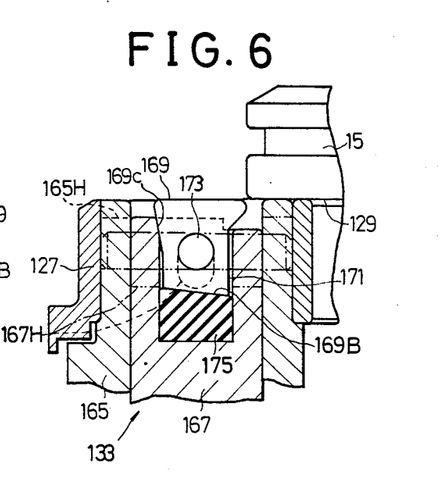
FIG. 6 is a view similar to FIG. 5, which shows another operation status.

When the hydraulic cylinder 165 is operated, the die push member 169 moves the piston rod 167 upward to fix the die 15 as shown in FIG. 5 or downward to release the die 15 as shown in FIG. 6.

In more detail, the piston rod 169 is initially moved down as shown in FIG. 6. In this state, the support pin 173 is located on the upper side of the slot 167H of the piston rod 167 and on the lower side of the slots 165H of the hydraulic cylinder 165, so that the die push member 169 is retracted from die receiving portion 129. Therefore, die 15 can be removed in the horizontal direction from the die receiving portion 129.

Under these conditions that the die push member 169 is retracted from the die receiving portion 129 as shown in FIG. 6, when the piston rod 167 is moved upward within the hydraulic cylinder 165, both the ends of the support pin 173 are brought into contact with the upper sides of the slots 165H of the hydraulic cylinder 165 and stop. Under these conditions, the die push member 169 is projected from the die receiving portion 129. When the piston rod 167 is further moved upward, the piston rod 167 rises relative to the die push member 169, the elastic member 175 is compressed gradually, and further the top end of the piston rod 167 is brought into contact with the cam surface 169C of the die push member 169 to move the die push member 109 against the elastic member 175 in the clockwise direction in FIGS. 5 and 6 with the pin 173 as its center, so that the die 15 is pushed against the die locating portion 163 as shown in FIG. 5.

Under the conditions as shown in FIG. 5, when the piston rod 167 of the hydraulic cylinder 165 is moved downward, the operation opposite to that described above will be effected to retract the die push member 169 from the die receive portion 129, so that the die 15 is released as shown in FIG. 6.

As understood by the above embodiment, the die fixing device 133 for fixing the die 15 against the die holder 107 is small in size, simple in construction, and easy to assemble with the rotatable die holder 107. Further, the die 15 can be fixed or released automatically, and therefore, the die 15 can be replaced smoothly at the die holder 15 without obstruction.

With reference to FIGS. 1 and 2 again, as amplified by FIG. 3 the tool holder plate 27 for supporting a plurality of tool sets 25 is disposed at a level higher than the die holder 107, and a plurality of tool set holders 177 for removably supporting the tool sets 25 are arranged at regular angular intervals near the outer periphery of the tool holder plate 27. This tool holder plate 27 is rotatably supported at roughly the middle of the upper arm 13U of the tool holder 13 in the X-axis direction.

In more detail, a fixed shaft 179 is vertically disposed at the middle of the upper arm 13U to rotatably support the tool holder plate 27. A chain 183 (see FIG. 2) is trained around a chain sprocket 181 fixed to the tool holder plate 27 and a drive sprocket 187 rotatably disposed in a reduction gear 185 mounted on the frame 3. This reduction gear 185 is connected to a servomotor 189 for rotating the drive sprocket 187. 129. When the piston rod 167 is further moved upward, the piston rod 167 rises relative to the die push member 169, the elastic member 175 is compressed gradually, and further the top end of the piston rod 167 is brought into contact with the cam surface 169C of the die push member 169 to move the die push member 109 against the elastic member 175 in the clockwise direction in FIGS. 5 and 6 with the pin 173 as its center, so that the die 15 is pushed against the die locating portion 163 as shown in FIG. 5.

Under the conditions as shown in FIG. 5, when the piston rod 167 of the hydraulic cylinder 165 is moved downward, the operation opposite to that described above will be effected to retract the die push member 169 from the die receive portion 129, so that the die 15 is released as shown in FIG. 6.

As understood by the above embodiment, the die fixing device 133 for fixing the die 15 against the die holder 107 is small in size, simple in construction, and easy to assemble with the rotatable die holder 107. Further, the die 15 can be fixed or released automatically, and therefore, the die 15 can be replaced smoothly at the die holder 15 without obstruction.

With reference to FIGS. 1 and 2 again, the tool holder plate 27 for supporting a plurality of tool sets 25 is disposed at a level higher than the die holder 107, and a plurality of tool set holders 177 for removably supporting the tool sets 25 are arranged at regular angular intervals near the outer periphery of the tool holder plate 27. This tool holder plate 27 is rotatably supported at roughtly the middle of the upper arm 13U of the tool holder 13 in the X-axis direction.

In more detail, a fixed shaft 179 is vertically disposed at the middle of the upper arm 13U to rotatably support the tool holder plate 27. A chain (see FIG. 2) is reeved around a chain sprocket (8) fixed to the tool holder plate 27 and a drive sprocket 187 rotatably disposed in a reduction gear 185 mounted on the frame 3. This reduction gear 185 is connected to a servomotor 189 for rotating the drive sprocket 187.

When the servomotor 189 is driven to rotate the tool holder plate 27, the tool sets 25 on the tool holder plate 27 can be indexed or positioned at a predetermined position. That is, it is possible to index a desired tool set 25 to an automatically tool exchangeable position to which the automatic tool exchange device 29 is accessible to exchange the tool set 25 of the punch 19 and die 15 arranged at the punch holder 95 and the die holder 107, respectively.

With reference to FIG. 2, the automatic tool exchange device 29 for automatically exchanging the tool set 25 fitted to the punch holder 95 and the die holder 107 is disposed at a position almost the same distance away from the tool holder plate 27 having plural tool sets and away from the process position.

In more detail, the automatic tool exchange device 29 is provided with a first arm 191 and a second arm 193. The first arm 191 serves to remove a tool set 25 from the tool holder plate 27 and fit the removed tool set to the punch holder 95 and the die holder 107. The second arm 193 serves to remove a tool set 25 from the process position and return the removed tool set to the tool holder plate 27. The positional relationship between the first and second arms 191 and 193 is such that when the first arm 191 is positioned at the tool holder plate 27 (tool exchange position), the second arm 193 is positioned at the process position. Both the arms 191 and 193 are telescopically movable independently and are the same in structure. Therefore, only the second arm 193 will be described in further detail hereinbelow, and the elements of the first arm 191 will be denoted by primed reference numerals without repeating the description thereof.

Figure 7:
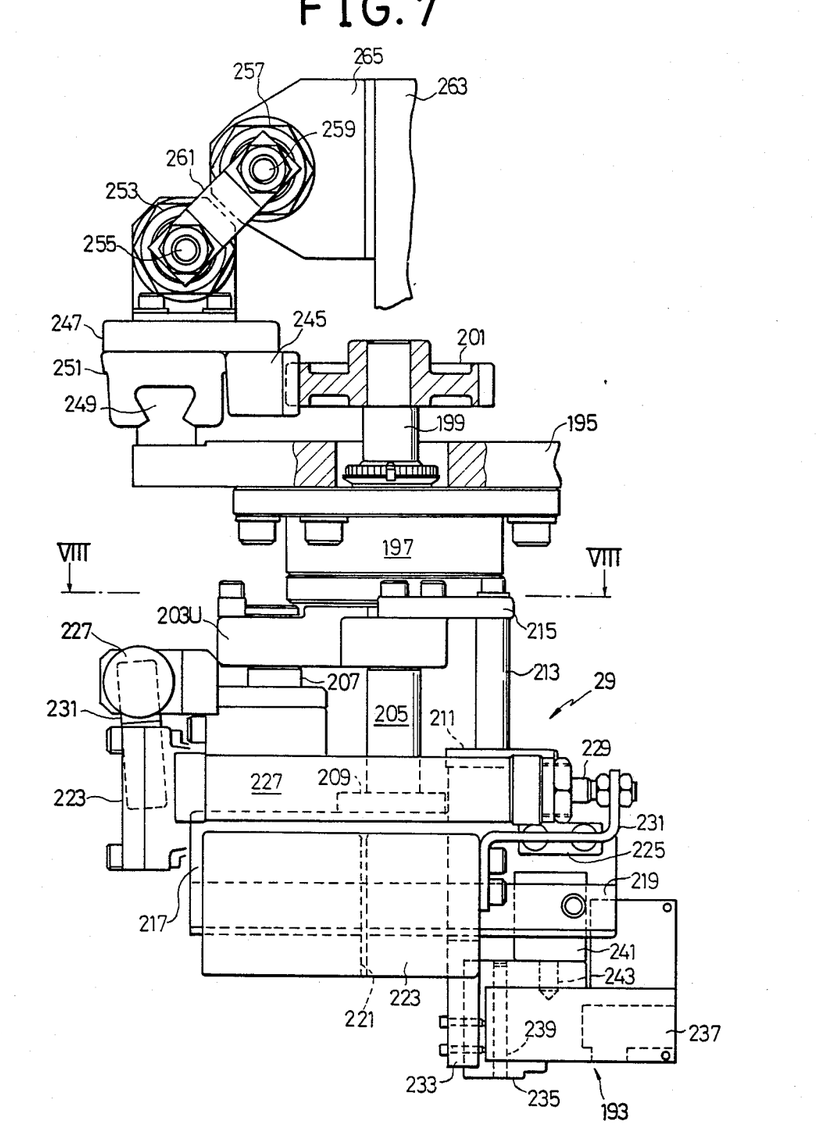
FIG. 7 is an enlarged view as seen from the line VII—VII in FIG. 2.
Figure 8:
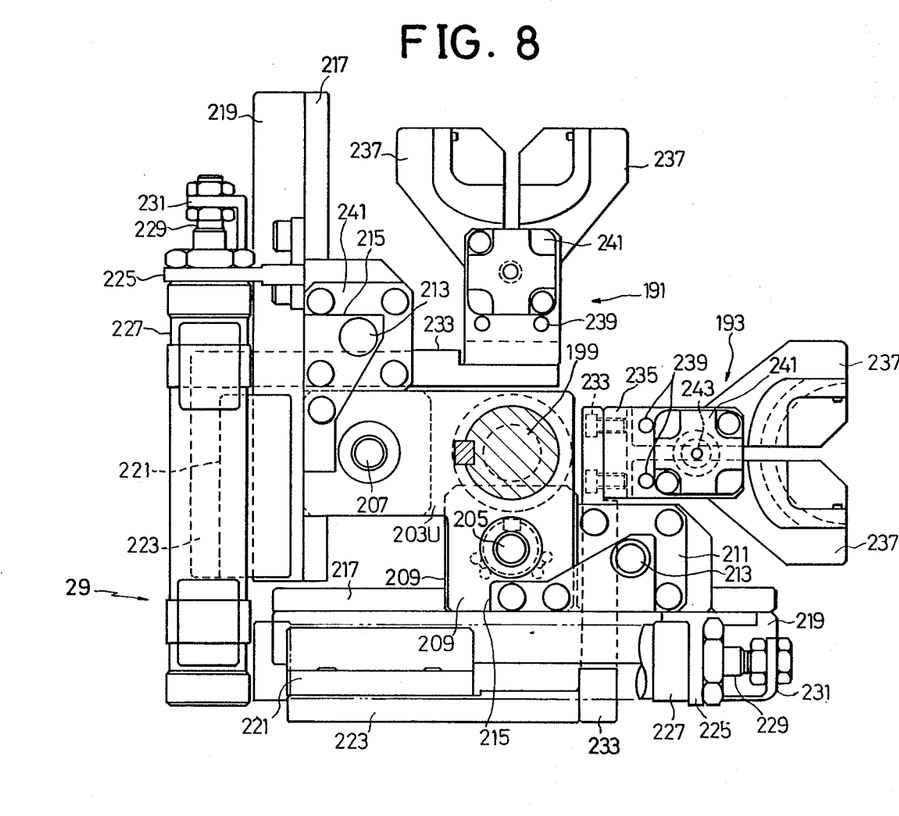
FIG. 8 is a view as seen from line VIII—VIII in FIG. 7.

As shown in FIGS. 7 and 8, a bracket 195 for supporting the automatic tool exchange device 29 is mounted on the upper frame 9 (not shown in FIG. 7) of the punch press 1. A pivotal shaft 199 is pivotably supported vertically on the bracket 195 via a bearing device 197. On the upper end of the pivotal shaft 199, a pinion gear 201 is fixed. A pair of upper and lower L-shaped (when seen from above) brackets 203U, 203L (only 203U is shown in FIG. 7) are fixed to the pivotal shaft 199 via keys at the center thereof. A guide bar 205 for guiding the second arm 193 in the vertical direction is vertically supported on one end of the upper and lower L-shaped brackets 203U and 203L. Another guide bar 207 for guiding the first arm 191 in the vertical direction is vertically supported on the other end of the L-shaped brackets 203U and 203L.

To move the second arm 193 up and down, an up-and-down block 209 is guided by the guide bar 205. The upper end of a piston rod 213 fixed to the up-and-down block 209 is connected to one end of the upper L-shaped bracket 203U via bracket 215. Therefore, when the up-and-down cylinder 211 is operated, the up-and-down block 209 is moved up and down along the guide bar 205.

To move the second arm 193 to and fro, a guide rail support plate 217 is fixed to the up-and-down block 209 on which a guide rail 219 is supported horizontally. A slider 221 is reciprocably supported on this guide rail 219. A connecting plate 223 is attached to the slider 221.

A hydraulic cylinder 227 is supported on the guide rail support plate 217 via a T-shaped support bracket 225. The top of the piston rod 229 disposed in the hydraulic cylinder 227 is linked with the connecting plate 223 via an appropriately bent connecting member 231.

Therefore, when the hydraulic cylinder 227 is operated, the connecting plate 223 can be moved to and fro horizontally along the guide rail 219.

To construct the second arm 193, the base portion of the arm plate 233 extending perpendicular to the guide rail 219 is fixed to the connecting plate 223. A C-shaped arm-bracket 235 is fixed to one end of the arm plate 233. A pair of fingers 237 are pivotably supported by the arm bracket 235 via hinge pins 239. A pair of the fingers 237 grasps or releases the tool set. The fingers 237 are always urged by a spring (not shown) in the direction that the two fingers approach each other to grasp the tool set.

To release the tool set 25 grasped by the two fingers 237, an open/close cylinder 241 is mounted on the arm bracket 235. A piston rod 243 provided within this open/close cylinder 241 so as to be movable up and down is formed into a taper shape at the lower end thereof so that the tapered end can enter a space between two fingers 237 to open the fingers 237 against the spring, that is, to release the tool set 25.

To pivot the automatic tool exchange device 29 between the process position and the tool holder plate 27, a rack 245 (FIG. 9) is in mesh with the pinion gear 201 fixed to the pivotal shaft 199.

Figure 9:
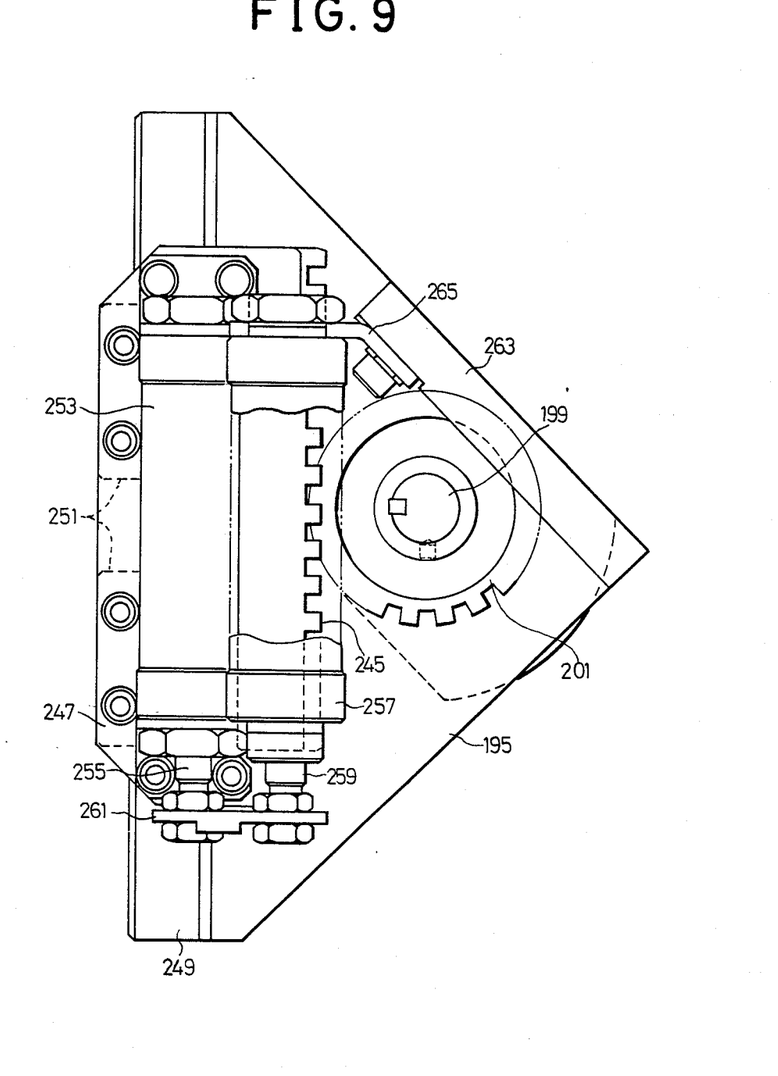
FIG. 9 is a plan view of FIG. 7.

In more detail, as shown in FIGS. 7 and 9, the rack 245 is fixed to a slide plate 247. The slide plate 247 is movably supported via slider 251 on a guide rail 249 arranged horizontally on the bracket 195. To move the slide plate 247 to and fro, a first cylinder 253 is mounted on the slide plate 247. An end of a piston rod 255 movably disposed within the first cylinder 253 is connected to that of a piston rod 259 of the second cylinder 257 via a connecting member 261. The second cylinder 257 is supported by a support plate 263 vertically fixed to the bracket 195 via another bracket 265.

When either one or both of the first cylinder 253 and the second cylinder 257 are operated, the pinion gear 201 is pivoted via the rack 245 to pivot the automatic tool exchange device 29.

Figure 10A:
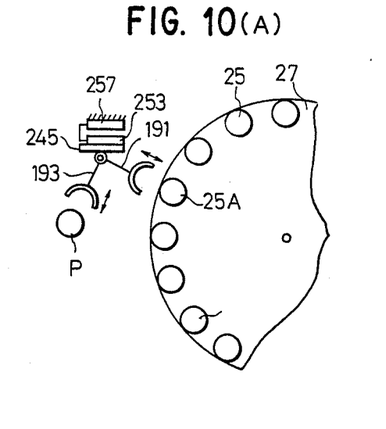
FIGS. 10(A), (B) and (C) are diagrams for assistance in explaining the operation of the apparatus made in accordance with the invention.

As understood from FIG. 9 with further reference to FIG. 10, when the piston rod 255 of the first cylinder 253 is retracted to the stroke end and further the piston rod 259 of the second cylinder 257 is also retracted to the stroke end, the first arm 191 is located so as to face a tool set 25A on the tool holder plate 27 indexed to the tool exchange position and the second arm 193 is located so as to face the process position, as depicted in FIG. 10(A).

Therefore, first the first arm 191 and the second arm 193 are each raised to a height corresponding to the tool holder plate 27 and the process position P by operating the up-and-down cylinder 211, and then the first arm 191 and the second arm 193 are moved by operating the cylinders 227, in order to grasp the tool set 25A on the tool holder plate 27 with the fingers 237 of the first arm 191 and to grasp the tool set 25 at the process position P with the fingers 237 of the second arm 193.

Figure 10B:
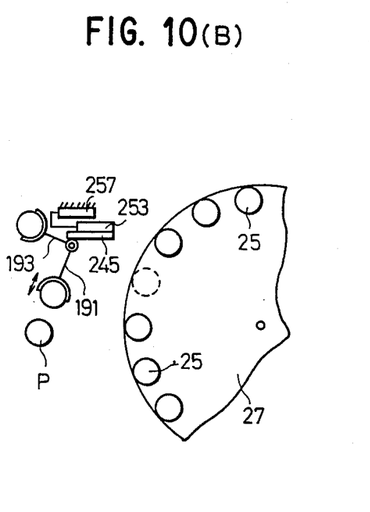

After the first and second arms 191, 193 have each grasped the tool sets, the arms 191, 193 are pivoted by operating the hydaulic cylinders 253, 257. Thereafter, when the first cylinder 253 is protruded to the stroke end, the first arm 191 is located at the process position P as depicted in FIG. 10 (B).

Therefore, the tool set 25A grasped by the first arm 191 can be set at the process position P by lowering and protruding the first arm 191 to the process position P and by operating the open/close cylinder 241. Further, at the process position, the die fixing device 133 and the punch fixing device 131 are operated to fix or release the tool set 15 of die 15 and punch 19.

Figure 10C:
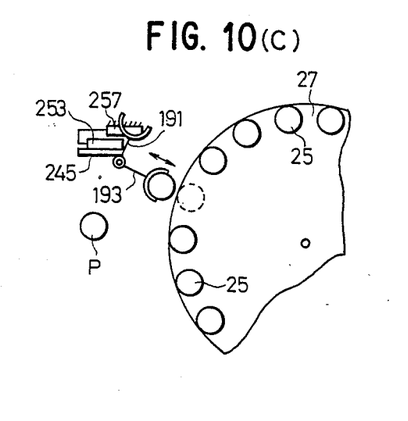

After the tool set 25A grasped by the first arm 191 has been set to the process position and the first arm 191 has been retracted, when the piston rod 255 of the first cylinder 253 is retracted to the stroke end and the piston rod 259 of the second cylinder 257 is protruded to the stroke end, the second arm 193 is located so as to face the tool holder plate 27, as depicted in FIG. 10(C), so that the tool set removed from the process position can be accommodated to the tool holder plate 27.

After the tool set has been exchanged, if the first arm 191 is positioned as shown in FIG. 10(A) and the succeeding tool set 25 is previously grasped by the first arm 191, it is possible to increase the tool exchange speed or the processing efficiency.

Further, since the first and second arms 191, 193 are positioned at the stroke end of the first and second cylinders 253, 257, it is possible to accurately locate the positions of the two arms 191, 193.

As described above, in the punch press according to the present invention, the ram drive unit can easily be assembled; the deformation of the upper frame due to heat generated from the ram drive unit can be prevented; and therefore the punch and the die can be kept aligned.

Further, high-precision can be maintained, because no slip will be produced in the pivotal movement of the punch holder, even if the punch holder is repeatedly moved up and down violently.

Further, the angular position of the die relative to the die holder can be determined accurately, because the device for fixing the die to the die holder is small in size and simple in structure.

Furthermore, the positions of the arms of the automatic tool exchange device can be determined accurately and therefore the tool set at the process position can be exchanged efficiently and accurately.

What is claimed is:

1. A punch press comprising:
   a frame;
   a tool holder arranged on the frame, for removably supporting at a process position a tool set comprising a punch and a die;
   a ram supported on the frame, for striking the punch so as to punch a workpiece placed between the punch and the die;
   means arranged in the frame, for storing a plurality of tool sets to be exchanged for the tool set supported on the tool holder, said storing means being adapted to position a predetermined tool set selected from among the stored tool sets at a tool exchange position wherein a tool set to be exchanged is removed from the tool set storage means; and
   an automatic tool exchange device supported on the frame, for exchanging the tool set supported on the tool holder for a tool set stored in the tool set storage means,
   the automatic tool exchange device further comprising;

(a) a pivotal shaft pivotally supported on the frame with a longitudinal axis thereof disposed vertically with respect to said frame;

(b) a first arm supported on the pivotal shaft, for removing a tool set positioned at the tool exchange position on the storage means, and for setting the removed tool set to the process position on the tool holder;

(c) a second arm supported on the pivotal shaft, for removing a tool set arranged at the process position on the tool holder, and for returning the tool set to the tool exchange position on the storage means, the second arm being supported on the pivotal shaft so as to be substantially perpendicular to the first arm in a plane disposed horizontally with respect to said frame, wherein said pivotal shaft is adapted to be pivoted and positioned at an angular position in which the first arm is located to face the tool exchange position on the tool set storage means and the second arm is located to face the process position on the tool holder;

(d) means supported on the frame for pivoting the pivotal shaft, said pivotal shaft pivoting means capable of positioning the pivotal shaft at three different angular positions, wherein at the first angular position, the first arm is located to face the tool exchange position on the tool set storage means and the second arm is located to face the process position on the tool holder, at the second angular position, the first arm is located to face the process position with the second arm located to face a position other than the process position and the tool exchange position, and at the third angular position, the second arm is located to face the tool exchange position with the first arm located to face a position other than the process position and the tool exchange position;

said pivotal shaft pivoting means further comprising;

(i) a second cylinder supported on the frame, (ii) a first cylinder supported on the second cylinder with a longitudinal axis thereof parallel to a longitudinal axis of the second cylinder, said first and second cylinders each having respective pistons, the first cylinder being mechanically coupled to the second cylinder in a manner such that when the respective pistons of the first and the second cylinders are projected or retracted, the first cylinder is moved along the longitudinal direction thereof, and when both pistons of the cylinder are retracted to their stroke ends, the first cylinder is positioned at a first position with respect to the longitudinal axes of the first and second cylinders, when the piston of the second cylinder is retracted to the stroke end and the piston of the first cylinder is projected to the stroke end, the first cylinder is positioned at a second position with respect to the longitudinal axes of the first and second cylinders, and when the piston of the second cylinder is projected to the stroke end and the piston of the first cylinder is retracted to the stroke end, the first cylinder is positioned at a third position with respect to the longitudinal axes of the first and second cylinders, and (iii) means connecting the first and second cylinders with the pivotal shaft for pivoting the pivotal shaft in accordance with the movement of the first cylinder, wherein the first, the second, and the third angular positions of the pivotal shaft correspond to the first, the second, and the third positions of the first cylinder, respectively.

2. The punch press of claim 1 wherein the first cylinder is coupled to the second cylinder by a connecting member connecting the piston of the first cylinder to the piston of the second cylinder.

3. The automatic tool exchange device according to claim 2, which further comprises:

a slide plate fixed to the first cylinder, the slide plate being supported via a slider on a guide rail arranged on said frame; wherein a rack is fixed to said slide plate, said rack being in mesh with a pinion gear mounted on the top of said pivotal shaft.

4. The automatic tool exchange device according to claim 2, wherein; when said first and second pistons are retracted to their stroke ends, said first arm is located to face the tool exchange position and said second arm is located to face the process position; when said first piston is protruded to the stroke end, said first and second arms rotate so that said first arm is located to face the process position, and; when the second piston is protruded to the stroke end, said first and second arms rotate so that said second arm is located to face said tool holder plate.

5. The punch press of claim 1 wherein the means connecting the first and second cylinders with the pivotal shaft for pivoting the pivotal shaft in accordance with the movement of the first cylinder comprises a rack fixed to the first cylinder and a pinion mounted on the pivotal shaft.

6. The punch press according to claim 1, further comprising: fingers attached to a free end each of said first and second arms, the fingers including a spring to grasp a tool set such that two of said fingers comprise a pair; and piston rods coupled to open/close cylinders associated with said arms and adapted to actuate said fingers against the force of said spring to release the tool set.

7. The punch press as set forth in claim 1, wherein said means connecting the first and second cylinders with the pivotal shaft comprises:

a rack and a pinion; and wherein said first and second hydraulic cylinders and said respective pistons move said first and second arms from said tool exchange position in which a tool set is arranged on a tool holder plate of said tool holder to the process position or vice versa by said rack and pinion; and when said first arm is located at the tool set on the holder plate, said second arm is located at the process position or vice versa.

8. The punch press as set forth in claim 1, wherein said first and second pistons are connected to each other and arranged in parallel to each other; when said first and second pistons are retracted to their stroke ends, said first arm is located at the tool exchange position and said second arm is located at the process position; and when said first and second pistons are projected to their stroke ends, said first arm is located at the process position and said second arm is located at the tool exchange position.

* * * * *